United States Patent [19]

Okamoto et al.

[11] Patent Number: 5,087,655
[45] Date of Patent: Feb. 11, 1992

[54] RUBBER MODIFIED STYRENE RESIN COMPOSITION

[75] Inventors: Yasushi Okamoto; Yoshinori Kanno, both of Chiba; Kouziro Matsuo, Yamatokoriyama; Minoru Yoshinaka, Higashiosaka; Jun Yagi, Hirakata, all of Japan

[73] Assignees: Sumitomo Chemical Company, Limited; Matsushita Electric Industrial Co., Ltd., both of Osaka, Japan

[21] Appl. No.: 478,514

[22] Filed: Feb. 12, 1990

[30] Foreign Application Priority Data

Feb. 21, 1989 [JP] Japan .................. 1-042173

[51] Int. Cl.$^5$ .............................. C08K 3/22
[52] U.S. Cl. ........................ 524/432; 523/176; 523/212; 524/504
[58] Field of Search ............ 524/432, 504; 523/172

[56] References Cited

U.S. PATENT DOCUMENTS 4,148,637 4/1979 Kubota et al. .................. 428/447
4,761,451 8/1988 Moteki .......................... 524/505

FOREIGN PATENT DOCUMENTS 0325797 8/1989 European Pat. Off. .
55-69638 5/1980 Japan ................... 524/432
118940 9/1980 Japan .

OTHER PUBLICATIONS

Data WPIL, No. 87-106165, Derwent Publications Ltd., London, GB and JP-A-62 054 742 (MITSUBISHI BELTING K.K.) 10-03-1987 Abstract.

*Primary Examiner*—Paul R. Michl
*Assistant Examiner*—Edward J. Cain
*Attorney, Agent, or Firm*—Stevens, Davis, Miller & Mosher

[57] ABSTRACT

Disclosed is a rubber modified styrene resin composition which comprises 50-98% by weight of a rubber modified styrene resin and 50-2% by weight of zinc oxide whiskers. This composition can provide molded articles excellent in mechanical strength, surface state and vibration damping characteristics. Impact strength can be further improved by adding to the above composition a rubber-like material. The zinc oxide whiskers preferably have a tetrapod-formed crystal structure and furthermore, is preferably surface treated with a coupling agent such as silane compound.

8 Claims, No Drawings

RUBBER MODIFIED STYRENE RESIN COMPOSITION

BACKGROUND OF THE INVENTION

The present invention relates to a thermoplastic resin composition containing zinc oxide whiskers. More particularly, it relates to a novel styrene resin composition improved in mechanical strength (especially flexural modulus), heat resistance and vibration damping characteristics without damaging the ease of molding and excellent surface appearance of a molded article which are inherent to styrene resins, and materials suitable for exterior materials of business and office machines and light electrical appliances are provided.

Hitherto, improvement of properties of thermoplastic resin compositions has been carried out by incorporating one or more of glass fiber, powders such as talc and calcium carbonate, flaky materials such as mica and whiskers such as potassium titanate into the composition.

It has been known that use of inorganic fibers such as glass fiber which have a high aspect ratio is effective especially for providing resin composition excellent in mechanical strength.

However, though mechanical strength can be improved by use of inorganic fillers such as glass fiber, the surface state of molded articles is considerably deteriorated.

On the other hand, when inorganic fillers such as glass fiber which has a low aspect ratio are used, the surface state of molded articles is improved, but there is little improvement in mechanical strength. In addition, even if mechanical strength is improved by adding these inorganic fillers, loss factor ($\eta$) obtained by measuring viscoelasticity tends to decrease and hence the vibration damping characteristics thereof are not preferred for use of the composition as housings of business and office machines or light electrical appliances.

Thus, development of resin composition superior in mechanical strength, surface state and vibration damping characteristics of molded articles has been demanded.

SUMMARY OF THE INVENTION

The object of the present invention is to provide a resin composition superior in mechanical strength, surface state and vibration damping characteristics of molded articles thereof.

The present invention is a composition which comprises a rubber modified resin composition in which zinc oxide whiskers are incorporated and which has the following requirements.

DESCRIPTION OF THE INVENTION

That is, the present invention relates to a rubber modified resin composition comprising 50-98% by weight of a rubber modified styrene resin and 50-2% by weight of a zinc oxide whiskers.

The rubber modified styrene resins include those which are obtained by copolymerizing styrenic monomer with copolymerizable polydiene rubbers such as butadiene rubber, chloroprene rubber and isoprene rubber, styrene-diene elastomers such as styrenebutadiene rubber, and block copolymer elastomers having polydiene block in molecular structure such as styrenebutadiene-styrene rubber.

Furthermore, there can be additionally copolymerized with other monomers copolymerizable with styrenic monomers such as acrylonitriles such as acrylonitrile and metharylonitrile, unsaturated carboxylic acids such as acrylic acid and methacrylic acid, esters of unsaturated carboxylic acids such as methyl acrylate and methyl methacrylate, dienes such as chloroprene, butadiene and isoprene, olefins such as 1-butene and 1-pentene and $\alpha.\beta$-unsaturated carboxylic acids or anhydrides thereof such as maleic anhydride.

The rubber modified styrene resins include resin mixtures of the above various rubber modified styrene resins as a main component with other resins. Examples of such styrene resins are rubber-reinforced polystyrene, styrene-acrylonitrile copolymer, methyl methacrylate-styrene copolymer, and ABS.

These styrene resins can be prepared by various polymerization processes such as bulk polymerization, solution, solution polymerization, emulsion polymerization, suspension polymerization and bulk-suspension polymerization. These styrene resins may optionally contain ordinary additives such as plasticizer, antioxidant, ultraviolet absorber, heat stabilizer, foaming agent and colorant.

The zinc oxide whisker used in the present invention comprises nucleus portion and needle crystal portion which extends from the nucleus portion in different axial directions. Diameter of base part of said needle crystal portion is 0.7-14 $\mu$m and length from the base part to tip of the needle crystal portion is 3-200 $\mu$m. Especially preferable whisker is of tetrapod form having needle crystal portion which extends in four axial directions.

The zinc oxide whisker can be subjected to surface treatment with a coupling agent so as to improve mechanical strength and surface state of styrene resin composition by increasing bonding power between the whisker and styrene resin as a matrix by providing a group which bonds to the styrene resin and a group which bonds to zinc oxide whisker as a filler. The coupling agents used for the above purpose include silane coupling agents, titanate coupling agents and aluminum coupling agents.

The silane coupling agents are generally silane compounds represented by the formula:

$$R_1-Si(OR_2)_3$$

[wherein $R_1$ represents a substituent selected from amino-alkylene group, amino-alkylene-amino-alkylene group, vinyl group, acryloxy group, methacryloxy group, epoxy-cyclohexyl-alkylene group, glycidoxy-alkylene group and mercapto-alkylene group and $R_2$ represents an alkyl group or a hydrogen atom]. As examples of the silane compounds, mention may be made of alkoxysilanes such as $\gamma$-methacryloxypropyl-trimethoxysilane, $\gamma$-aminopropyl-trimethoxysilane, N-$\beta$-(aminoethyl)-$\gamma$-aminopropyl-trimethoxysilane, $\beta$-(3,4-epoxycyclohexyl)ethyltrimethoxysilane, $\gamma$-glycidoxypropyl-trimethoxysilane, vinyl-tris(2-methoxy-ethoxy)-silane and $\gamma$-mercaptopropyltrimethoxysilane and hydroxysilanes corresponding to these alkoxysilanes.

The titanate coupling agents include known ones such as isopropyl-triisostearoyl-titanate and isopropyl-tridodecylbenzenesulfonyl-titanate. The aluminum coupling agents also include known ones such as acetoalkoxy-aluminum-diisopropylate.

These coupling agents can be used in known manners, for example, by dissolving the coupling agent in an organic solvent, immersing zinc oxide whiskers in this solution, then removing the solvent and drying the whiskers or by mixing the coupling agent in dry state with zinc oxide whiskers at from room temperature to 250° C. The amount of the coupling agent used is 0.01-10 parts by weight, preferably 0.1-5 parts by weight per 100 parts by weight of zinc oxide whiskers. If necessary, carboxylic acid may be used in combination with the coupling agent for surface treatment.

The styrene resin composition comprising a styrene resin and zinc oxide whiskers can be prepared by uniformly mixing these components at a mixing ratio within the range mentioned above by conventional method using optional blender, laboplast mill, single screw neader, twin-screw kneader and the like. The thus obtained styrene resin composition is molded into desired articles by ordinary extrusion molding, injection molding, etc.

In preparation of the styrene resin composition, there may be added additives which are normally used in styrene resins such as flame retardant, pigment, plasticizer, antioxidant, and ultraviolet absorber, dispersant used for incorporation of inorganic fibers as reinforcing agent, modifier for improving adhesion between inorganic fibers and thermoplastic resin, inorganic filler and other reinforcing fibers.

In order to further improve impact resistance, rubber-like material may also be added to the composition. As nonlimiting examples of this rubber-like material, mention may be made of polydiene rubbers such as butadiene rubber, chloroprene rubber and isoprene rubber, styrene-diene elastomers such as styrenebutadiene rubber and block copolymer elastomers having polydiene block in molecular structure such as styrenebutadiene-styrene rubber.

The proportion of zinc oxide whiskers to be added to rubber modified styrene resin varies depending on kind of the rubber modified styrene resin, but is 50-2% by weight of zinc oxide whiskers for 50-98% by weight of styrene resin.

If the amount of zinc oxide whiskers is more than 50% by weight, strength of the composition decreases and besides becomes hard and brittle, resulting in inferior balance of properties such as composition and poor surface appearance of molded articles. If it is less than 2% by weight, the reinforcing effect of the whisker is insufficient.

The present invention will be explained by the following examples and comparative examples.

Properties of test piece produced by injection molding the rubber modified styrene resin composition of the following examples and comparative examples were measured by the following methods.
(1) Tensile strength JIS K7113
(2) Tensile elongation: JIS K7113
(3) Flexural strength: ASTM D790
(4) Flexural modulus: ASTM D790
(5) Izod impact strength JIS K7110 (notched ¼" Izod impact strength)
(6) Vicat softening point JIS K7206
(7) Deflection temperature under load: JIS K7207
(8) Surface state of molded article:
This was evaluated by the criterion of the following four grades.
ⓞ: Excellent
: Good
Δ: Fairly good
X: Bad
(9) Vibration damping characteristics: The rubber modified styrene resin composition was molded into a plate of 300 mm in length, 25 mm in width and 3 mm in thickness by press molding method and loss factor ($\eta$) was measured by application of forced vibration of a frequency of 1000 Hz by mechanical impedance method (central vibrating method at room temperature 20° C.) Vibration-damping property measuring apparatus manufactured by Kobayashi Rigaku Kenkyusho was used as the instrument for measurement.

Examples 1-3

Rubber-reinforced polystyrene (ESBRITE KS2100 manufactured by Sumitomo Chemical Co., Ltd.; hereinafter referred to as "HIPS") as styrene resin and zinc oxide having tetrapod-formed form with diameter of the base part of the needle crystal portion being 0.7-14 μm and length from base to tip of the needle crystal portion being 3-200 μm as zinc oxide whiskers were mixed at a weight ration of HIPS/zinc oxide whiskers=86/14, 81/19 or 68/32 and kneaded by an extruder to prepare rubber modified styrene resin compositions, which were subjected to measurement of properties.

Example 4

In addition to the HIPS and the zinc oxide whisker in Example 1, styrene-butadiene-styrene rubber (TUFPRENE A manufactured by Asahi Kasei Kogyo K.K.; hereinafter referred to as "SBS rubber") was used as a rubber-like material to improve impact strength at a weight ratio of HIPS/zinc oxide whiskers/SBS rubber=63/30/7 and the mixture was kneaded by an extruder to prepare a rubber modified styrene resin composition, which was subjected to measurement of properties.

Comparative Examples 1-3

Only HIPS, a mixture of HIPS/glass fiber=85/15 and a mixture of HIPS/SBS rubber=90/10 were respectively kneaded by an extruder to prepare rubber modified styrene resin compositions, which were subjected to measurement of properties.

Results of measurement in Examples 1-4 and Comparative Examples 1-3 are shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| HIPS KS2100 (part by weight) | 86 | 81 | 68 | 63 | 100 | 85 | 90 |
| Zinc oxide whiskers (part by weight) | 14 | 19 | 32 | 30 | — | — | — |
| Glass fiber*1 (part by weight) | — | — | — | — | — | 15 | — |
| SBS rubber*2 (part by weight) | — | — | — | 7 | — | — | 10 |
| Melt flow rate (g/10 min) | 4.5 | 4.1 | 3.7 | 1.6 | 4.5 | 1.9 | 3.0 |

TABLE 1-continued

|  | Example 1 | Example 2 | Example 3 | Example 4 | Comparative Example 1 | Comparative Example 2 | Comparative Example 3 |
|---|---|---|---|---|---|---|---|
| Tensile strength (kg/mm$^2$) | 2.4 | 2.6 | 2.9 | 2.9 | 3.0 | 4.1 | 2.7 |
| Tensile elongation (%) | 35 | 31 | 9.5 | 40 | 65 | 2.5 | 75 |
| Flexural modulus (kg/mm$^2$) | 260 | 270 | 320 | 230 | 220 | 350 | 180 |
| Flexural strength (kg/mm$^2$) | 4.4 | 4.6 | 5.2 | 4.4 | 4.5 | 4.7 | 3.3 |
| Izod impact strength (kg·cm/cm) | 3.6 | 3.1 | 2.3 | 6.6 | 8.0 | 3.6 | 11.5 |
| Vicat softening point (°C.) | 97 | 98 | 99 | 93 | 96 | 99 | 89 |
| Deflection temperature (°C.) under load | 85 | 86 | 86 | 80 | 81 | 95 | 73 |
| Surface state | ⊚ | ⊚ | ⊚ | ⊚ | ⊚ | X | ◯ |
| Loss Factor ($\eta$) | 0.009 | 0.010 | 0.012 | 0.019 | 0.007 | 0.007 | 0.017 |

*1: ECS 015 T321 with diameter: 13μ and length: 1.5 mm manufactured by Japan Glass Fiber Co.
*2: TUFPRENE A manufactured by Asahi Kasei Kogyo K.K.

As explained above, by adding zinc oxide whiskers having tetrapod-formed crystal structure to a rubber modified styrene resin composition, mechanical strength (especially flexural modulus) and surface state of molded articles can be improved and loss factor ($\eta$) obtained by measurement of viscoelasticity can also be increased. This has not been attained by the compositions containing conventional inorganic components.

According to these characteristics, vibration damping characteristics of housings of light electrical appliances and office machines can be improved and especially sound characteristics can be remarkably improved. The composition can be used for TV housing and materials for speaker boxes.

What is claimed is:

1. A rubber modified styrene resin composition which comprises 50–98% by weight of a rubber modified styrene resin and 50–2% by weight of a zinc oxide whiskers.

2. A composition according to claim 1, wherein the zinc oxide whiskers have a tetrapod-formed crystal structure.

3. A composition according to claim 1, wherein the zinc oxide whiskers are surface treated with a coupling agent.

4. A composition according to claim 3, wherein the coupling agent is a silane coupling agent.

5. A composition according to claim 3, wherein the amount of the coupling agent is 0.01–10 parts by weight per 100 parts by weight of zinc oxide whiskers 6. A composition according to claim 1, wherein the rubber modified styrene resin is rubber-reinforced polystyrene, styrene-acrylonitrile copolymer or methyl methacrylate-styrene copolymer.

7. A composition according to claim 1, which additionally contains at least one rubber selected from the group consisting of polydiene rubbers, styrenediene elastomers and block copolymer elastomers having polydiene block in the molecular structure.

8. A composition according to claim 7, wherein the rubber is selected from the group consisting of butadiene rubber, chloroprene rubber, isoprene rubber, styrene-butadiene rubber and styrene-butadiene-styrene rubber.

* * * * *